United States Patent [19]

Flood et al.

[11] Patent Number: 4,767,050
[45] Date of Patent: Aug. 30, 1988

[54] POCKETED STUD FOR POLYCRYSTALLINE DIAMOND CUTTING BLANKS AND METHOD OF MAKING SAME

[75] Inventors: Gary M. Flood, Canal Winchester; Gary W. Smith, New Albany, both of Ohio

[73] Assignee: General Electric Company, Worthington, Ohio

[21] Appl. No.: 843,318

[22] Filed: Mar. 24, 1986

[51] Int. Cl.$^4$ .................. B23K 31/02; E21B 10/46
[52] U.S. Cl. .................................... 228/122; 228/222; 175/329
[58] Field of Search .... 76/108 A, DIG. 11, DIG. 12; 228/122, 222; 175/329

[56] References Cited

U.S. PATENT DOCUMENTS

| | | | |
|---|---|---|---|
| 4,098,362 | 7/1978 | Bonnice | 175/329 |
| 4,199,035 | 4/1980 | Thompson | 175/410 |
| 4,221,270 | 9/1980 | Vezirian | 175/329 |
| 4,225,322 | 9/1980 | Knemeyer | 175/329 X |
| 4,303,136 | 12/1981 | Ball | 175/329 |
| 4,373,410 | 2/1983 | Davis | 175/329 X |
| 4,452,324 | 6/1984 | Jurgens | 175/393 |
| 4,520,881 | 6/1985 | Phaal | 175/329 |
| 4,527,998 | 7/1985 | Knemeyer | 51/309 |

*Primary Examiner*—Nicholas P. Godici
*Assistant Examiner*—Carmine Cuda
*Attorney, Agent, or Firm*—Mueller and Smith

[57] ABSTRACT

Disclosed is an improved brazed implement comprising a composite compact having an abrasive particle layer bonded to a support and a substrate bonded to the support by a brazing filler metal having a liquidus substantially above 700° C. disposed therebetween. In a preferred embodiment the composite compact comprises a sectioned cylindrical composite compact having a lower support surface opposite the support surface bonded to said abrasive particle layer. The composite compact also has a mating surface. The substrate about its upper end has a pocket which comprises an interior face complementary in shape with the compact lower support surface and a land complementary in shape with the compact mating surface. The compact is brazed to the substrate. The abrasive particle layer is spaced-apart from contact with the substrate a distance adequate to minimize thermal damage thereto during the brazing of the compact to the substrate. The land is of sufficient depth, however, to provide support for the compact. The preferred composite compact comprises a polycrystalline diamond compact bonded to a cemented carbide support. The preferred substrate is a cemented carbide substrate. The improved implement has special utility in drill bits for oil and gas exploration and in mining applications.

11 Claims, 1 Drawing Sheet

POCKETED STUD FOR POLYCRYSTALLINE DIAMOND CUTTING BLANKS AND METHOD OF MAKING SAME

BACKGROUND OF THE INVENTION

The present invention relates to implements incorporating abrasive particle compacts and more particularly to a pocketed stud for receiving the abrasive particle compacts. The abrasive particle compact implements have special utility in drill bits for oil and gas exploration and in mining applications.

An abrasive particle compact is a polycrystalline mass of abrasive particles such as diamond and/or cubic boron nitride bonded together to form an integral, tough, high-strength mass. Such components can be bonded together in a particle-to-particle self-bonded relationship, by means of a bonding medium disposed between the particles, or by combinations thereof. For examples, see U.S. Pat. Nos. 3,136,615; 3,141,746; and 3,233,988. A supported abrasive particle compact herein termed a composite compact, is an abrasive particle compact which is bonded to a substrate material, such as cemented tungsten carbide. Compacts of this type are described, for example, in U.S. Pat. Nos. 3,743,489, 3,745,623, and 3,767,371. The bond to the support can be formed either during or subsequent to the formation of the abrasive particle compact.

Composite compacts have found special utility as cutting elements in drill bits. These compacts can be attached directly to the drill crown of drill bits by a variety of techniques. U.S. Pat. No. 4,156,329 proposes to furnace braze a pre-tinned metal-coated compact to recesses formed in the crown. U.S. Pat. No. 4,186,628 proposes to attach the compact cutters to the crown by placing the compacts in a mold, filling the crown portion of the mold with powder, and running a low temperature infiltration braze into the mold to form the crown containing the compacts embedded therein. U.S. Pat. No. 4,098,362 proposes drill bits in the manner of the latter proposal wherein the cutters are placed at a rake angle of between −10° and -31 25°.

Alternatively, composite compacts can be affixed to an elongated stud or substrate which stud then is attached to the drill crown. The stud provides greater attachment area to the drill crown. It also provides more support for the abrasive particle compact thereby increasing its impact resistance. Composite compacts have been attached to studs in both a right cylinder configuration as depicted in U.S. Pat. No. 4,200,159, and in an angled configuration, as shown, for example, in U.S. Pat. No. 4,265,324.

Although the benefits of attaching a composite compact to a stud or substrate are apparent, problems have been encountered in achieving the actual attachment. In particular, it has been noted that composite compacts in which the abrasive portion is self-bonded and metal infiltrated such as described in U.S. Pat. No. 3,745,623 and available commercially under the trademarks Compax and Syndite are susceptible to thermal damage if exposed to temperatures in excess of about 700° C. (As used herein self-bonded means that the abrasive particles are directly bonded one to another.) This damage is thought to result from a differential in the thermal expansion rate of the abrasive and metal phases. At elevated temperatures there is also a risk of degradation to the particles themselves as by graphitization or oxidation. This type of degradation is thought to be of concern for all types of diamond abrasive particle compacts. Accordingly, braze alloys with liquidus temperatures of less than 700° C. were utilized initially for attachment of composite compacts to studs or substrates. Unfortunately, such low temperature braze alloys found only limited applicability in the marketplace due to their characteristically low bond strengths.

A major breakthough in the attachment of composite compacts to substrates was made by Knemeyer in U.S. Pat. Nos. 4,225,322 and 4,319,707. The Knemeyer process permits the use of high temperature braze alloys for attaching a composite compact to a substrate. Such high temperature braze alloys, in turn, provide significantly greater bond strengths. While the Knemeyer method and apparatus permit the use of high temperature braze alloys, difficulty has arisen in the selection of a suitable one. Preferred brazing alloys include the gold-based alloy disclosed in commonly-assigned U.S. Pat. No. 4,527,998 and the palladium-based braze alloy disclosed in commonly-assigned application Ser. No. 752,419, filed July 5, 1985. The braze filler alloys have a liquidus above 700° C.

Another geometric configuration of the abrasive particle compact implemtns involves the use of a recessed or pocketed stud which receives the abrasive particle compact. Various adaptations of such pocketed studs can be seen in U.S. Pat. Nos. 4,452,324, 4,303,136, 4,221,270, 4,199,035, 4,098,362 and 4,373,410. One unifying characteristic of these proposals is that the stud ledge or land upon which rests the mated edge of the compact supports the entire thickness of support and abrasive particle layer and can extend beyond the abrasive particle layer.

BROAD STATEMENT OF THE INVENTION

The present invention is addressed to solving the problem discussed above wherein high temperature (700° C. and above) brazing is used in the Knemeyer bonding process. The improved brazed implement of the present invention comprises a composite compact having an abrasive particle layer bonded to a support and a stud or other substrate bonded to said support by a brazing filler metal disposed therebetween. Improvement in the brazed implement comprises the composite compact comprising a cylindrical or sectioned composite compact having a lower support surface opposite the support surface bonded to said abrasive particle layer, and having a mating edge or surface. The substrate near its upper end has a pocket or recess which comprises an interior face complementary in shape with the compact lower support surface and a land or ledge complementary in shape with the compact mating surface. The compact is brazed to the substrate with a braze filler metal having a liquidus above 700° C. The depth of the pocket is such that the abrasive particle layer is spaced-apart from contact with the substrate a distance adequate to minimize thermal damage thereto during the brazing of the compact to the substrate, but yet is of sufficient depth to provide support for the compact.

Another aspect of the present invention is a method for manufacturing the improved brazed implement. Such method comprises brazing the composite compact to a substrate using the Knemeyer process discussed above. The composite compact comprises a composite compact having a lower support surface opposite the support surface bonded to the abrasive particle layer and a mating surface. The substrate about its upper end has a pocket comprising an interior face complementary in shape with the compact lower support surface and a land complementary in shape with the compact mating surface. Brazing is conducted in an apparatus which is provided with a heat sink which maintains the temperature of the abrasive particle layer below its degradation temperature. The braze filler metal has a liquidus above 700° C. Brazing is conducted at a braze temperature and for a time adequate for the composite compact to be joined to the substrate but inadequate for causing thermal damage or degradation to the abrasive particle layer.

Desirably, the abrasive particle layer comprises polycrystalline diamond bonded to a carbide support. Also, the substrate desirably is a carbide stud.

Advantages of the present invention include a brazed implement design which substantially retains the performance of the compact while providing a recess or pocket in the substrate or stud. Another advantage is the retention of such compact properties while being above to reliably manufacture the brazed implement with minimal manufacturing losses. These and other advantages will be readily apparent to those skilled in the art based upon the disclosure contained herein.

These drawings will be described in detail below.

DETAILED DESCRIPTION OF THE INVENTION

While pocketed studs may contribute to improved implement performance by virtue of the increased support surfaces, this geometry presents unique problems when the compact is brazed to the pocketed stud utilizing the Knemeyer process. In this process, the diamond table is in thermal communication with a heat sink. But with a pocketed stud, the heat sink also is in communication with an adjacent portion of the stud. This means that at this juncture and in the adjacent region of compact/stud interface, achievement of high brazing temperatures necessary for achieving good melt and flow of the braze filler metal becomes difficult if not impractical. If this region is heated to a sufficiently high temperature for achieving proper melt and flow of the braze filler metal, then the diamond table is exposed to the high temperatures at which thermal damage can occur. Avoidance of exposing the diamond table to such elevated temperatures is the essence of the Knemeyer apparatus and process. Thus, the manufacturer is faced with a dilemma of how to achieve a good brazed joint while precluding thermal damage to the diamond table.

U.S. Pat. No. 4,520,881 and other prior pocketed stud designs do not encounter this problem since they employ a braze alloy having a working temperature of less than 700° C. Thus, there is no need for a heat sink inasmuch as the braze temperature is less than the degradation temperature of the polycrystalline diamond compact.

During the experiments on the present invention it was discovered that certain factors exist which tend to make increased pocket depth desirable, while other factors exist which tend to make decreased pocket depth desirable. Heretofore, cylindrical drill blank implements made by the Knemeyer process did not utilize a recess, but relied upon the cylindrical composite compact being brazed to a substantially flat front surface of the stud. Those which did use a recess employed it in conjunction with a low (less than 700° C.) temperature braze. Factors which tend to make the use of decreased pocket depth desirable include the requirement to minimize thermal damage to the polycrystalline diamond layer and the ability to adequately have the braze flow around the composite compact blank and throughout the bond line. Factors which tend to make deep pockets desirable include the ability to provide increased protection and support of the compact blank in the down-hole environment. It is believed that down-hole protection is especially important when a half-round or other partial composite compact is used. Thus, it appears that a balance between these diverse factors must be struck. The present invention recognizes this and provides such a balance between these factors in the improved brazed implement disclosed herein.

Figure 1:
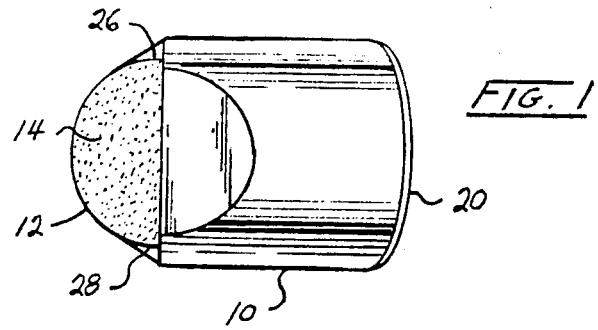
FIG. 1 is a front elevational view of the improved brazed implement.
Figure 2:
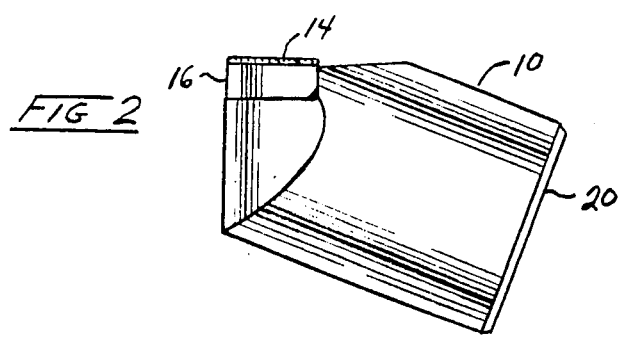
FIG. 2 is a side elevational view of the improved brazed implement.
Figure 3:
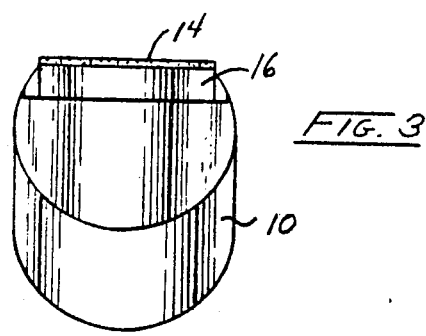
FIG. 3 is a perspective, overhead elevational view of the brazed implement.
Figure 4:
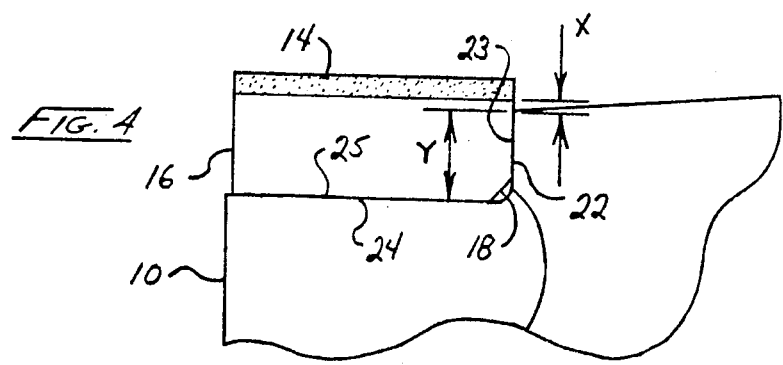
FIG. 4 is an exploded side view of the improved brazed implement at its braze location with the substrate or stud.

Referring to FIG. 1, the improved brazed implement is seen to comprise substrate or stud 10 and sectioned composite compact 12. By "sectioned" is meant that a cylindrical composite compact or drill blank has been sliced or cut along its vertical axis to provide a partial cylindrical compact. Alternatively, this configuration can be provided in the manufacturing operation. Thus, appropriate sectioned compacts may be semicircular in cross-section, wedge or pie-shaped in cross-section, etc. Of course, the present invention also encompasses the use of full round compacts. Sectioned compacts may have a flat formed mating surface or the mating surface formed may be curvilinear or otherwise. Cutting of the compacts may be accomplished by an EDM or like machine (see U.S. Pat. No. 4,463,241). Regardless of the manner of providing the full or sectioned composite compact, such compact as shown is composed of abrasive particle layer 14 which is bonded to support 16 (see FIGS. 2–4). Abrasive particle layer 14 preferably is a polycrystalline diamond layer and support 16 preferably comprises cemented carbide. Support 16 as shown in FIG. 4 also contains chamfer 18 for clearing the radius provided at the intersection of faces 22 and 24. The references cited in the background, above, provide a description of suitable composite compacts including their manufacture.

Substrate or stud 10 also contains chamfer 20 and desirably comprises a cemented metal carbide, such as cemented tungsten carbide. The basic configuration of stud 10 is conventional as described in the art cited above.

Referring to FIG. 1, compact locations 26 and 28 may be subject to damage down-hole unless special measures are taken for their protection. One such special measure is to fully support locations 26 and 28 with face 24.

With reference to FIG. 4, it will be observed that stud 10 has pocket or recess which has been fabricated about its upper end. This pocket is composed of land or ledge 22 which supports mating surface 23 of compact 12, and interior face 24 which is complementary in shape with lower support surface 25 of compact support 16. At the interface of compact surfaces 23 and 25, and land 22 and face 24, is disposed a braze alloy (which is not shown in the drawings). As will be apparent from the Knemeyer process, heat applied to stud 10 must be sufficient for the braze alloy at the interfaces of land 22 and surface 23, and face 24 and surface 25, to become sufficiently liquefied to flow and form a good braze joint between stud 10 and support 16. If abrasive particle layer 14 were in physical contact with stud 10, it has been found that the heat sink in thermal contact with particle layer 14 during the braze procedure in accordance with the Knemeyer process either can prevent the braze liquidus temperature (e.g. above 700° C.) from being reached or the elevated brazed temperature if reached can cause thermal damage to the abrasive particle layer.

In order to avoid this from happening, abrasive particle layer 14 is spaced apart from stud 10 by a distance X as set forth at FIG. 4. This translates into land 22 having a depth Y as set forth at FIG. 4. By providing distance X, the entire length of land 22 and face 24 can be heated to the necessary elevated braze temperature while abrasive particle layer 14 is maintained below its thermal degradation temperature by virtue of the design of the Knemeyer process.

In this connection, it will be appreciated that a balance between distances X and Y must be struck, as described above. If the pocket depth is too great, then thermal damage to abrasive particle layer 14 or an insufficient braze melt results. If the pocket depth or distance Y is too small, then impact failure of the compact or bond shear may become a problem as may overheating of the compact due to it being loaded up with rock flour down hole.

Tests were conducted at various pocket depths on a polycrystalline diamond compact with a diamond layer 0.035 inches thick bonded to a tungsten carbide support measuring 0.162 inches thick. The length of the mating edge of the polycrystalline composite compact was 0.94 inches. The carbide stud was about 1.75 inches in total height and had an outside diameter of about 1.12 inches. The configuration of the implements are like that depicted in the drawings. The brazed filler metal utilized included both the gold-based alloy of U.S. Pat. No. 4,527,998 (liquidus reported at 1004° C.) and the palladium-based alloy of Serial No. 752,419 (reported to be capable of brazing at 982°–1093° C.). Braze acceptability was determined by cross-sectioning the bonded samples while thermal damage to the polycrystalline diamond table was determined ultrasonically. The following results were recorded.

| Pocket Depth (Y, in.) | Abrasive Layer Distance (X, in.) | Braze Joint | Diamond Condition |
| --- | --- | --- | --- |
| 0 | 0.162 | Good | Good |
| 0.040 | 0.122 | Good | Good |
| 0.060 | 0.102 | Good | Good |
| 0.140 | 0.022 | Good | Good |
| 0.157 | 0.005 | Good | Some Thermal Damage |

Not shown in the above-tabulated data are field tests using the abovedescribed implement. It should be appreciated that the implement tested is massive in size compared to conventional products. Thus, this implement results in very large chips down-hole, ranging in size on up to 5 cm. in length. Such large chips present a substantial risk that an unsupported or undersupported half-round compact would be subjected to undue impact forces at the flat. Thus, the need to protect the sectioned compact as well as full rounds is seen. Based upon the above tabulated data and the field tests reported above, the best compromise appears to be a pocket depth or Y distance of about 0.14 inches. Acceptable pocket depths, however, range from about 0.12 to 0.15 inches. More importantly, it is preferred that X range from about 0.01 to 0.04 inches in order to minimize thermal damage to the polycrystalline diamond compact while maximizing support. Of course, it will be appreciated that this data and these ranges are dependent upon the dimensions of the composite compact and carbide stud tested. For drill blanks and studs of different dimensions, different pocket depths and diamond layer offset likely will be determined. These determinations, however, can be made in accordance with the precepts of the present invention to provide an improved brazed implement which retains the advantages of improved support due to the recess, but which minimizes thermal damage to the polycrystalline diamond layer during manufacturing operations and which increases manufacturing through-put and decreases manufacturing costs.

As noted above, the preferred abrasive particle layer comprises a self-bonded polycrystalline diamond having an infiltrated metal second phase. The preferred infiltrated metal second phase comprises cobalt. The support and substrate both preferably are cemented carbides. Suitable metal bonded carbides can be selected from the group consisting of tungsten carbide, titanium carbide, tungsten molybdenum carbide, and tantalum carbide. The metal providing the metal bond can be selected from the group consisting of cobalt, nickel, iron, and mixtures thereof. One preferred brazing metal is an alloy having a liquidus substantially above 700° C. and having the following composition by weight: gold, 18–49.5%; nickel, 3.5–14.5%; palladium, 2.5–10.5%; manganese, 7.5–9.0%; and copper the balance, as disclosed in U.S. Pat. No. 4,527,998. The second preferred brazing filler metal also has a liquidus substantially above 700° C. and has the following composition by weight: palladium, 20–80%; chromium, 2–13%; boron, 1–4%; and nickel, balance, as disclosed in commonly-assigned, co-pending application Ser. No. 06/752,419 (cited above). In this application, all references are expressly incorporated herein by reference.

We claim:

1. In a method for fabricating a brazed implement comprised of a cemented carbide-supported composite compact having a layer of selfbonded abrasive particles infiltrated with a metal second phase, the support of said compact being bonded to a cemented carbide substrate by a brazing filler metal having a liquidus substantially above 700° C. and above the thermal degradation temperature of said compact, which method comprises brazing said compact support to said substrate while disposing the abrasive particle layer in thermal contact with a heat sink, the improvement which comprises:

providing said composite compact comprising a lower support surface opposite the support surface bonded to said abrasive particle layer, and having a mating surface; and disposing said composite compact in a pocket disposed about the upper end of said substrate, said pocket comprising an interior face complementary in shape with said compact lower support surface and a land complementary in shape with said compact mating surface, said abrasive particle layer being spaced-apart from contact with said substrate a distance adequate to minimize thermal damage thereto during said brazing of the compact to the substrate yet is of sufficient depth to provide support for said compact.

2. The method of claim 1, wherein said composite compact comprises a sectioned cylindrical composite compact.

3. The method of claim 2 wherein said compact mating surface is flat.

4. The method of claim 3 wherein said flat mating surface is about one inch in length and said support is about 0.162 inches in thickness.

5. The method of claim 1 wherein said abrasive particle layer is spaced-apart from said substrate a distance of from between about 0.01 and 0.04 inches.

6. The method of claim 5 wherein said land is provided to be about 0.14 inches in depth.

7. The method of claim 1 wherein said cemented carbide support and said cemented carbide substrate are both metal bonded carbide selected from the group consisting of tungsten carbide, titanium carbide, tungsten molybdenum carbide, and tantalum carbide, wherein the metal providing the metal bond is selected from the group consisting of cobalt, nickel, iron, and mixtures thereof.

8. The method of claim 1 wherein said abrasive particle layer of said composite compact comprises a metal-infiltrated self-bonded polycrystalline diamond compact.

9. The method of claim 1 wherein said brazing filler metal is selected from the group consisting of, by weight: gold, 18–39.5%; nickel, 3.5–14.5%; palladium, 2.5–10.5%; manganese, 7.5–9.0%; and copper, balance: and palladium, 20–80%; chromium, 2–13%; boron, 1–4%; and nickel, balance.

10. An improved brazed implement comprising a composite compact having an abrasive particle layer bonded to a support and a substrate bonded to said support by a brazing filler metal having a liquidus substantially above 700° C. disposed therebetween, the improvement which comprises:

(a) said composite compact comprising a sectioned cylindrical composite compact having a lower support surface opposite the support surface bonded to said abrasive particle layer, and having a flat mating surface which is about one inch in length, said support being about 0.12 inch in thickness; and (b) said substrate about its upper end having a pocket comprising an interior face complementary in shape with said compact lower support surface and a land complementary in shape with said compact mating surface, said abrasive particle layer being spaced-apart from contact with said substrate a distance of between about 0.01 and 0.04 inch, said distance adequate to minimize thermal damage thereto during brazing of the compact to the substrate yet being of sufficient depth to provide support for said compact.

11. The improved brazed implement of claim 10 wherein said spaced apart distance is about 0.02 inches.

* * * * *